US006365886B1

(12) United States Patent
Ang et al.

(10) Patent No.: US 6,365,886 B1
(45) Date of Patent: Apr. 2, 2002

(54) SMART COLUMN CONTROLS FOR HIGH SPEED MULTI-RESOLUTION SENSORS

(75) Inventors: Lin Ping Ang, Pasadena; Alexander I. Krymski, Montrose, both of CA (US)

(73) Assignee: Photobit Corporation, Pasadena, CA (US)

(*) Notice: Subject to any disclaimer, the term of this patent is extended or adjusted under 35 U.S.C. 154(b) by 0 days.

(21) Appl. No.: 09/251,758

(22) Filed: Feb. 18, 1999

Related U.S. Application Data
(60) Provisional application No. 60/075,053, filed on Feb. 18, 1998.

(51) Int. Cl.[7] .................................................. H01L 27/00
(52) U.S. Cl. .................................... 250/208.1; 348/308
(58) Field of Search ........................... 250/208.1, 214 A; 348/308, 302, 294; 358/482, 483

(56) References Cited

U.S. PATENT DOCUMENTS

| | | | |
|---|---|---|---|
| 4,942,473 A | * 7/1990 | Zeevi et al. .................. 348/281 |
| 5,148,268 A | 9/1992 | Tandon et al. |
| 5,262,871 A | * 11/1993 | Wilder et al. ................ 348/307 |
| 5,267,335 A | * 11/1993 | Mita ........................ 250/208.1 |
| 5,471,515 A | 11/1995 | Fossum et al. |
| 5,550,653 A | 8/1996 | TeWinkle et al. |
| 5,631,704 A | 5/1997 | Dickinson et al. |
| 5,739,562 A | 4/1998 | Ackland et al. |
| 5,854,656 A | 12/1998 | Noggle |
| 5,874,993 A | * 2/1999 | Ciccarelli et al. ............ 348/294 |
| 6,009,214 A | * 12/1999 | Suggs ........................ 382/312 |
| 6,169,576 B1 | * 1/2001 | Monoi ........................ 348/272 |

OTHER PUBLICATIONS

Sunetra Mendis, Sabrina E. Kemeny, and Eric R. Fossum, "CMOS Active Pixel Image Sensor," *IEEE Transactions on Electron Devices*, vol. 41, No. 3, Mar. 1994.

Sunetra K. Mendis, Sabrina E. Kemeny, Russell C. Gee, Bedabrata Pain, Quiesup Kim and Eric R. Fossum, "Progress in CMOS Active Pixel Image Sensors," Proceedings of the SPIE vol. 2172, Charge–Coupled Devices and Solid State Optical Sensors IV (1994).

* cited by examiner

*Primary Examiner*—F. L Evans
(74) *Attorney, Agent, or Firm*—Fish & Richardson P.C.

(57) ABSTRACT

Smarts are added to a CMOS active pixel color linear image sensor operable in any of parallel-packed, pixel-packed, and line-packed readout mode, to provide the added feature of variable imaging resolution operability. By combining decoder block functionality with shift selection logic to provide column selection adaptable for lowering the resolution of an imaging process, higher speed imaging is possible. Furthermore, the added functionality is implemented in a manner which does not unduly impact chip size. More importantly, the added functionality is compatible with, and in fact complements the specific architecture of an active pixel color linear sensor with variable readout mode functionality incorporated therein.

19 Claims, 9 Drawing Sheets

Pixel-Packed Output—150dpi Resolution

Line-Packed Output—600dpi Resolution

Line-Packed Output—300dpi Resolution

Line-Packed Output—150dpi Resolution

*Line-Packed Output--600dpi Resolution*

Column Address 1

Decoder Address

Shift Register Selection

Column Address 2

Decoder Address

Shift Register Selection

Column Address 3

Decoder Address

Shift Register Selection

Line-Packed Output--300dpi Resolution

Column Address 1

Decoder Address

Shift Register Selection

Column Address 2

Decoder Address

Shift Register Selection

Column Address 3

Decoder Address

Shift Register Selection

*Line-Packed Output--150dpi Resolution*

Column Address 1

Decoder Address

Shift Register Selection

Column Address 2

Decoder Address

Shift Register Selection

Column Address 3

Decoder Address

Shift Register Selection

SMART COLUMN CONTROLS FOR HIGH SPEED MULTI-RESOLUTION SENSORS

CROSS REFERENCE TO RELATED APPLICATIONS

This application claims the benefit of the U.S. Provisional Application No. 60/075,053, filed on Feb. 18, 1998, which is incorporated herein by reference.

FIELD OF THE INVENTION

The present invention relates to color linear image sensors, and more particularly, to a active pixel color linear sensors with multi-resolution imaging capabilities.

BACKGROUND

Commonly-owned co-pending application Ser. No. 09/252,428 titled "Active Pixel Color Linear Sensor with Line-Packed Pixel Readout", filed even date herewith, and authored by one of the inventors in the instant case describes in detail the operation of an active pixel color linear image sensor operable in one or more desirable pixel readout modes. In particular, the parallel-packed, pixel-packed, and line-packed modes are described, the description of which is incorporated herein by reference together with the accompanying description of the timing and control logic, as well as the active pixel circuit architecture for constructing an active pixel linear sensor employing multi-readout mode functionality.

To summarize herein, parallel-packed readout involves the process whereby during color imaging the values of a set of same-color filtered pixels are sampled and then stored in a linear readout register array and then from there are output one at as time from each linear array. A typical color linear sensor may have three linear arrays (e.g., each storing filtered pixel values for each of the primary colors). In a three register array configuration operating in parallel-packed readout mode, red pixel R1, green pixel G1, and blue pixel B1 are output simultaneously by reading their values from the first column position in each array where they might be stored. In the same fashion, pixels R2, G2 and B2 are next output in parallel from column 2 of the parallel arrays. Thus, parallel readout is achieved by rippling through the arrays on a column-by-column basis. Conventional column decoding schemes are known in the art for enabling each column at the appropriate time during readout.

In pixel-packed mode, the second mode of operation discussed in the co-pending application, a multiplexer or the like is used to multiplex the parallel-stored signals so they are made available (read out) as a single analog data stream. For example, R1 is readout followed by G1 and then B1, all from column 1. Then the next column pixel values from each linear array register is read out in multiplexed fashion, i.e., R2, followed by G2, followed by B2, until all the color pixel values are read out from all the columns.

A third useful read out mode described with particularity in the co-pending application is that of line-packed pixel readout mode. In this mode, all same color pixel values are made available off-chip in serial stream fashion. For example, R1 is read out first followed by R2 then by R3, and so on until all red pixels are read out. This readout method continues until all the green pixels, followed by all the blue pixels, are read out in similar fashion. High speed read out is possible in the line-packed operational mode by storing each subsequent same color pixel value not only on a different column, but also in a different one of the three readout register arrays. In this manner, when shifting through the three register arrays, on a column by column basis, because a subsequent same color pixel value is stored on a different addressable array than the currently read out pixel, the reading out of the subsequent pixel may be initiated even before the current pixel is completely read out, thus resulting in high speed read out.

At the present, there is no single chip solution that provides off-chip serial stream of pixel data in line-packed form, but as has been explained in the co-pending application, such an operational mode is desirable. The most direct (but undesirable) approach to reading out the signals in the line-packed mode is to have the decoding of the readout registers be such that all the R signals are selected sequentially first from a first register array where they might be stored, followed by all the G pixels from a second register array, and finally by all the B pixels from a third register. For purposes explained in the co-pending application, storing consecutively read same-color pixel values in the same register array results in very poor throughput and in the case of a charge coupled device (CCD) color linear sensor, may also require an inordinate amount of extra 'on-chip' and 'off-chip' control. Accordingly, when line-packed readout is desired, sampling and storing consecutive same-color pixels in different register arrays is preferable.

In addition to selecting an appropriate readout mode, it is also desirable to be able to change the resolution setting of the linear sensor since certain applications need not require the full resolution. Often times, half or quarter image resolution is adequate. Regardless of the resolution selected, image sensors still sample and store the contents of every available pixel element in a corresponding storage element. Thus, while in theory reducing resolution should result in faster imaging, this is not the case with, for example, CCD type sensors which require that the entire contents of the linear imaging array be laterally shifted out. To provide lower resolution in such instance, appropriate off-chip AND/NOR decoding may be employed to select a sub-portion of the read out R, G, B pixel element values.

In the case of active pixel sensors, adding on-chip decoding functionality is possible to allow for selectively reading out, for example, every other pixel element (half-resolution: 300 dpi), or every fourth pixel (quarter resolution: 150 dpi), in a 600 dpi full resolution capable image sensor. This might be accomplished using appropriate AND/NOR decoding to selectively enable readout of certain columns in each register array but not others.

A problem with adding such decoding functionality is that in very large length linear array architectures (e.g., 5100 or more columns per row of pixel elements) sufficiently large decoding modules are required, thus impacting the vertical height properties of a single-chip solution, or in the case of an off-chip solution, sufficient real estate is taken up. Large vertical lengths are undesirable from a packaging standpoint.

While the above system level approach does offer the user ways of selecting the desired pixels at the right time, the time it takes for the user to get the all the pixel signals is still the same as that of full resolution even though less resolution is required.

Very large active pixel array sensors employ D flip flop shift registers to effectuate column addressing, instead of AND/NOR type decoders. Shift registers take up less space than say 10-bit column address decoders, and significantly less space than 14-bit decoders as may be employed in very high-resolution linear sensors. While the savings in vertical area could be substantial, shift registers obviously do not offer the flexibility of skipping columns to support variable resolution modes.

It would be desirable to be able to provide active pixel sensors with variable resolution control for faster imaging applications, without significantly impacting chip size.

It would further be desirable to be able to provide color active pixel linear sensors, operable in line packed mode, with variable resolution control for faster imaging applications.

SUMMARY

In consideration of the foregoing, one aspect of the invention is to provide active pixel sensors with variable resolution control for faster imaging applications, without significantly impacting chip size.

Another aspect of the invention is to provide color active pixel linear sensors, operable in line packed mode, with variable resolution control for faster imaging applications.

These and other aspects of the invention are achieved by employing shift register logic in combination with decoding logic to provide on-chip column addressing.

The foregoing and still other aspects of the invention, and the advantages thereof, will become fully apparent from the following description.

DESCRIPTION OF THE PREFERRED EMBODIMENTS

Column address selection for a single-chip CMOS active pixel color linear sensor is herewith described with reference to FIGS. 1–8.

Figure 1:
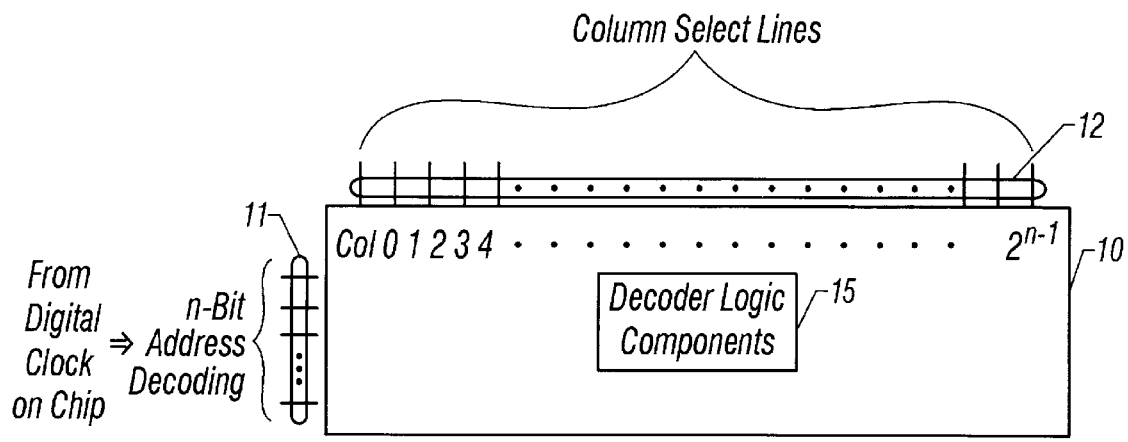
FIG. 1 shows a high level block diagram of a conventional n-bit to $2^n$-bit decoder module.

FIG. 1 shows a high level block diagram of a conventional n-bit to $2^n$-bit decoder module 10 as may be generally employed for generating column selection logic. Module 10 includes decoder logic components 15 controlled by n-bit wide control lines 11 that generate $2^n$ column selection signals 12, all in a known manner. Similarly, lines 11 are generated from a digital control block on-chip, in a conventional manner. A partial example of a 4-bit to 16 bit decoder module is shown by way of example at the bottom of FIG. 1.

Figure 2:
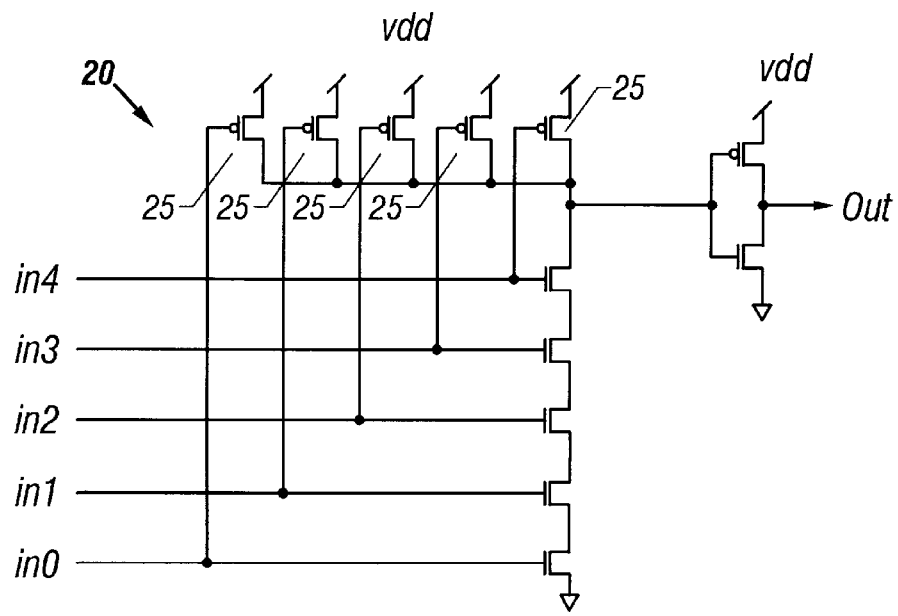
FIG. 2 shows the basic cell architecture of the module shown in FIG. 2 in the context of a 5-bit logical AND gate.

An example of a basic cell 20 of the module 10 is shown in FIG. 2. Cell 20 is basically a 5-bit logical AND gate. When all the gate control lines are high (in0, in1, in2, in3, in4) to the corresponding transistors 25, then the output (out) is also high. In the case of a 5-bit input decoder module, when all the input bits are high, the last column line (col31 of col0–col31) will go high. The above module 10 could be used to select column lines to readout pixel elements in a register array line (not shown).

Figure 3:
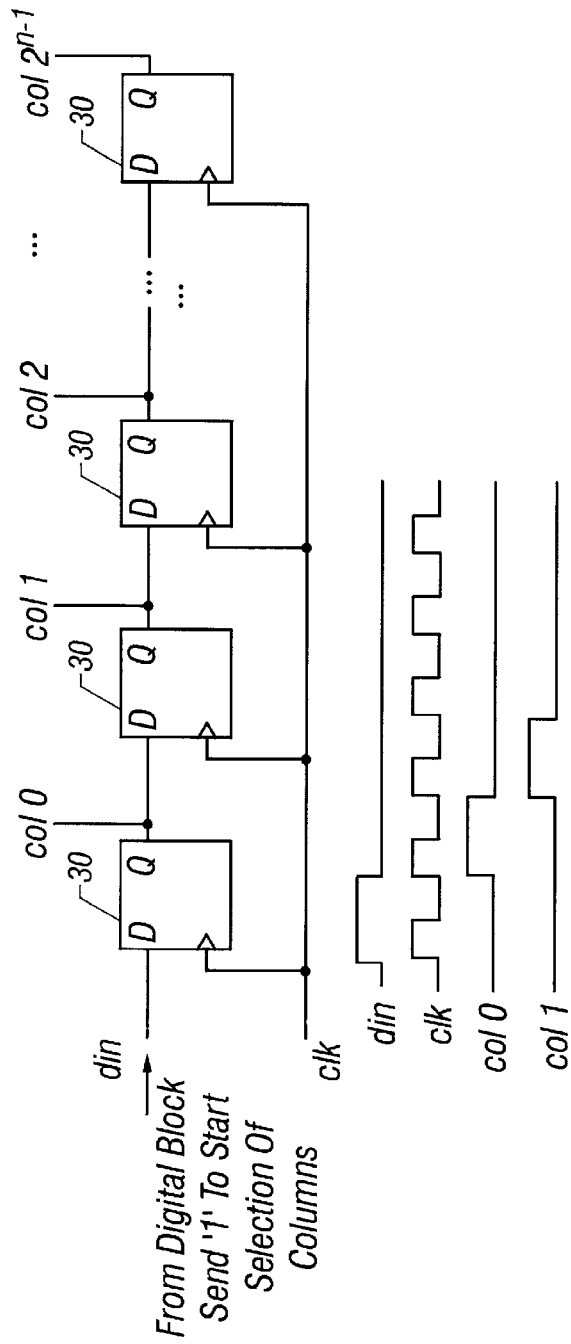
FIG. 3 shows a chain of combined D flip-flops.

Another way of sequentially selecting columns for readout could employ shift registers to shift the '1' bit across the array of column circuitry in the same way module 10 generates a single logic 'high' in response to an up-count of control lines 11. FIG. 3 shows how shifting might be implemented using a chain of combined D flip-flops 30. The operation of a D flip-flop is well known. In the illustrative example, the flip flop is rising-edge triggered, though other ways are know of achieving the same result. When the first column is to be selected, the digital control on-chip will send a '1' to the input of the first D flip-flop 30. The '1' value will be available at the next rising edge of the clock (clk). The digital block will then send a '0' value to the input of the first D flip-flop 30 so that only one column is selected at any one time. The '1' value will then propagate through the array of D flip-flops one by one at every rising edge of the clk line. The accompanying timing diagram shown in the figure more clearly illustrates the operation of column lines col0 to col31.

Figure 4:
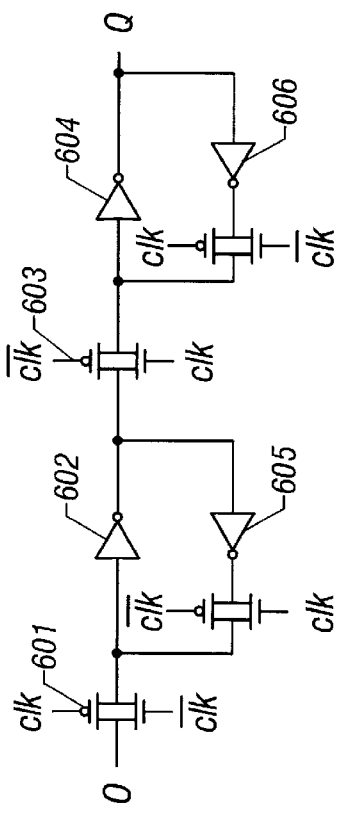
FIG. 4 shows a schematic diagram of a conventional master-slave D flip-flop.

FIG. 4 shows a schematic diagram of a conventional master-slave D flip-flop that may alternatively be employed to provide column shift register addressing. When a '1' is available at the input D, the value '1' will only be memorized by the D flip-flop at the falling edge of the clk line. This is because when clk line goes to '0' the CMOS switch 601 turns on. The value '1' is driven to the input of the master inverter 602. Output of the inverter 602 will then become '0' When the clk line goes to '1', the input switch 601 turns off while the second switch 603 turns on. The value '0' will be driven to the input of the slave inverter 604. The output Q will in turn become '1'. The other inverters 605, 606 are included to maintain the value of the master and slave inverters when their inputs are not driven from the previous stages.

The above discussion presents alternative ways of implementing column address selection generally and which may be employed for column address selection in a CMOS active pixel image sensors.

As discussed in the background, it would be desirable to be able to employ column selection in a manner which facilitates selectively addressing select columns for pixel readout so that all pixels need not be read out in a lower resolution mode.

FIGS. 5a–5g show a desired column selection logic for three different resolutions (600 dpi, 300 dpi, 150 dpi) and three different readout methods (parallel, pixel-packed and line-packed pixel readout).

In full resolution mode (600 dpi), all pixel signals in all columns must be read out. Thus, all the columns will be selected sequentially. In half resolution mode (300 dpi), the odd pixels preferably are skipped. Accordingly, selected columns shall be col2, col4, col6, etc. Finally in quarter resolution mode (150dpi), every other even pixel will be skipped in addition to all the odd pixels. The columns selected shall be col2, col6, col10, etc.

Figure 5A:
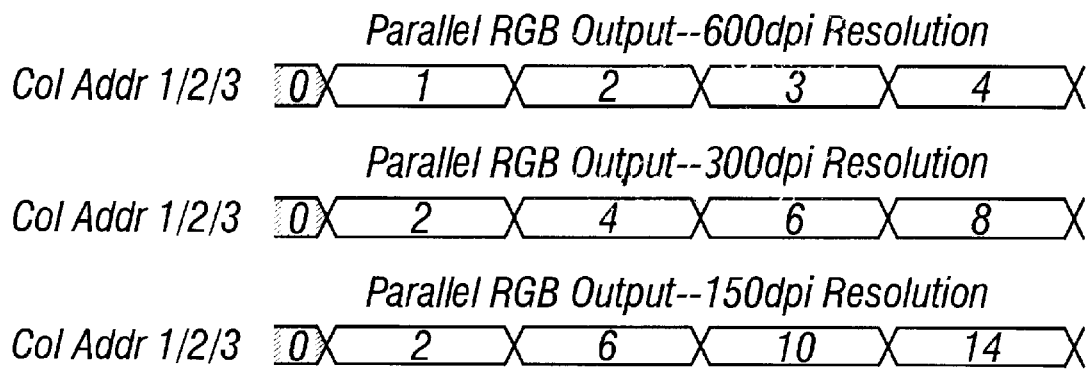
FIGS. 5a–5g show a desired column selection logic for three different resolutions (600 dpi, 300 dpi, 150 dpi) and three different readout methods (parallel, pixel-packed and line-packed pixel readout) in accordance with the present invention.

FIG. 5a shows the column selection logic for parallel-packed readout of pixel data from each of three readout register arrays (1, 2, 3) (not shown) where such pixel data is resident prior to readout, as described in detail in the co-pending application having been incorporated by reference herein. As can be seen, register array addressing occurs at the same time for each column of pixel data regardless of resolution mode.

Figure 5B:
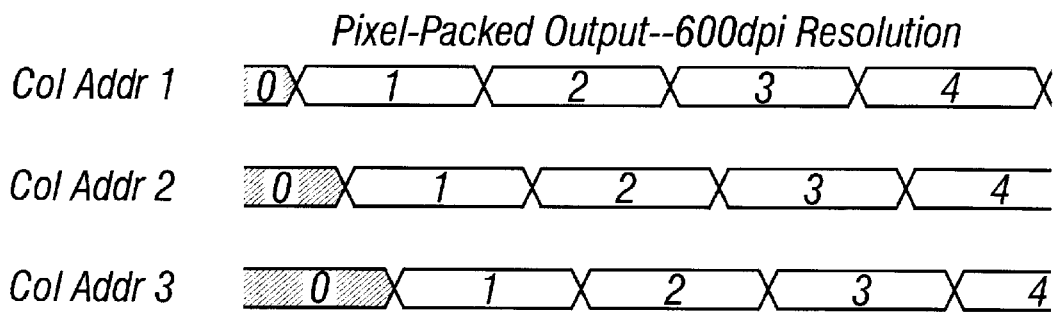

FIG. 5b shows the column selection logic for pixel-packed readout in the 600 dpi resolution mode. In this case, the column logic for column addressing 2 is shown delayed by a third of the column readout time from that of column addressing 1, the same delay holds true between the addressing of column addressing 3 relative to column addressing 2.

Figure 5C:
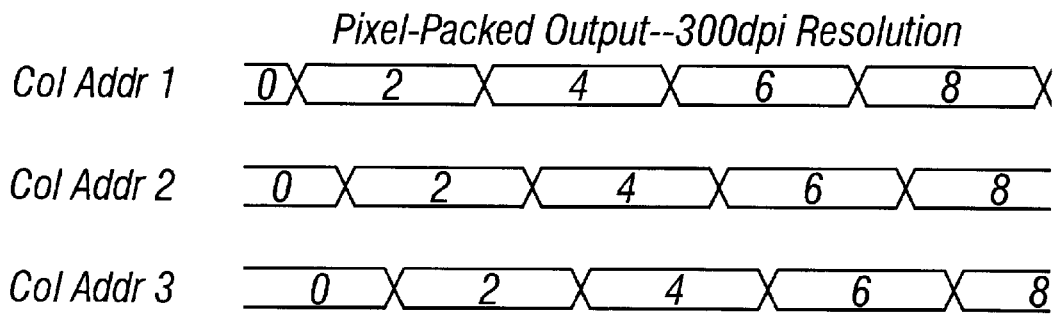
Figure 5D:
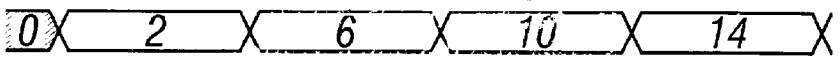
Figure 5D:
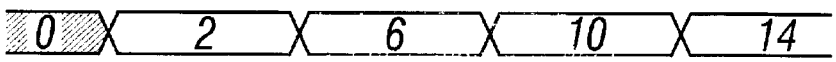
Figure 5D:
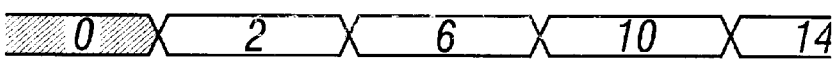

FIGS. 5c and 5d show 300 dpi and 150 dpi resolution modes, respectively, for pixel-packed readout.

Figure 5E:
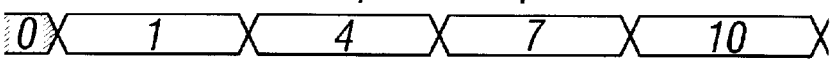
Figure 5E:
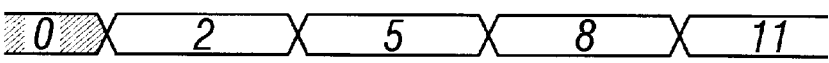
Figure 5E:
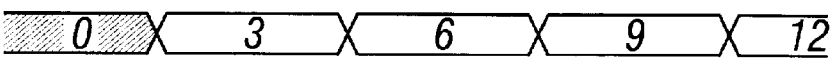
Figure 5F:
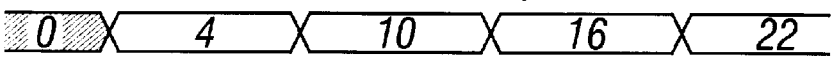
Figure 5F:
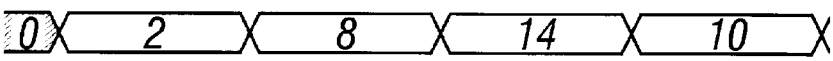
Figure 5F:
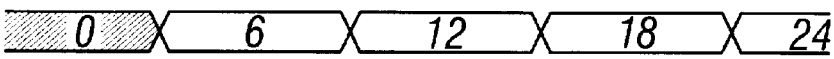
Figure 5G:
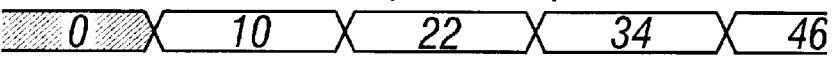
Figure 5G:
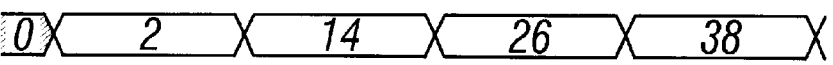
Figure 5G:
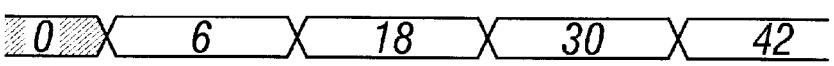

Line-packed pixel readout for each of the three resolution modes is shown in FIGS. 5e, 5f and 5g. As in the case of pixel-packed readout, pixel signals are read out a short time interval after the start of readout of a previous pixel in another line. Because in line-packed mode, pixels of the same color are spread out across the three different readout register arrays in cyclic manner, addressing of a next pixels from a particular line or array is in accordance with a predetermined, known position of such next pixel. In the case where all the red pixels will be read out first, a desired column selection logic must select R1 pixel from line array one, R2 pixel from line array 2, and R3 pixel from line array 3. This selection process repeats in a cyclic manner. The timing for switching between arrays to read out consecutive same colored pixels is again discussed at length in the co-pending application.

FIGS. 5f and 5g show the timing for line-packed readout in the 300 dpi and 150 dpi resolution modes, respectively. As can be seen, the fact that same color pixels are read out from different line arrays has no bearing on the fact that in any particular line array, lower resolution is obtained by activating every other column line (300 dpi) or every fourth column line (150 dpi) per line array to achieve the desired resolution.

A close inspection of the timing chains shown in FIGS. 5a to 5g reveals a worst case incremental column selection in the 150 dpi resolution during line-packed output (FIG. 5g). An increment of twelve (12) column numbers exists between readouts on any particular line array .

A preferred embodiment of the invention shall now be described with reference to FIGS. 6a to 6f. These figures show column selection, implemented using a combination decoder module approach and shift register selection, the specific circuitry of which is described below in connection with FIGS. 7–8. As will become clear from the following discussion, the disclosed column selection methodology and associated circuitry is intended to be implemented as part of an active pixel linear sensor architecture with variable readout mode capability, of the type described in the co-pending application, to provide such sensor device with the added capability of variable resolution selection. As will be further explained below in connection with the column selection logic of FIG. 7, such variable resolution functionality is afforded using common column selection addressing taking into consideration the various readout (parallel-packed, pixel-packed and line-packed) pixel readout modes of operation.

In the illustrative embodiment shown in FIGS. 6a–6f, column selection is implemented in groups of twelve (12). Each group is individually column addressable by an associated decoder module or block 40, 45. Single shift register selection (i.e., only 1 clock pulse) is employed using a chain of flip flops 50, 55 to move between 12-column groups across a line array. Because, as explained earlier, a worst case increment defining a maximum logical distance between addressable column lines of a line array is 12, a decoder block architecture is desired capable of control selection of address lines in each 12-column group spanning a linear array. For this purpose, four-to-sixteen decoder blocks 40, 45 are used to select column address lines with values between 0 and 15 (though it is understood that the maximum count necessary is 12).

The relationship between module decoder column selection and shift register column selection is best described by the timing diagrams in FIGS. 6a to 6f. For ease of understanding, the delay periods described in FIGS. 5b–5g in connection with pixel-packed and line-packed readout are not presented.

Figure 6A:
FIGS. 6a–6f are timing diagrams depicting the relationship between module decoder column selection and shift register column selection for various resolution modes in accordance with the present invention.

As shown in FIG. 6a, the decoder address repeats after the column address advances past the value of 12. Shift register selection is employed to pass on the value of '1' to a next shift register in a physical chain, enabling a next decoder block.

Figure 6B:
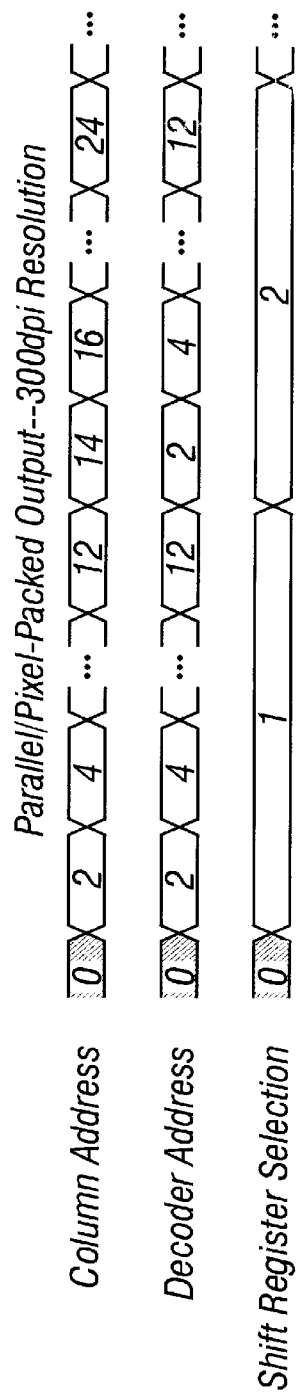
Figure 6C:
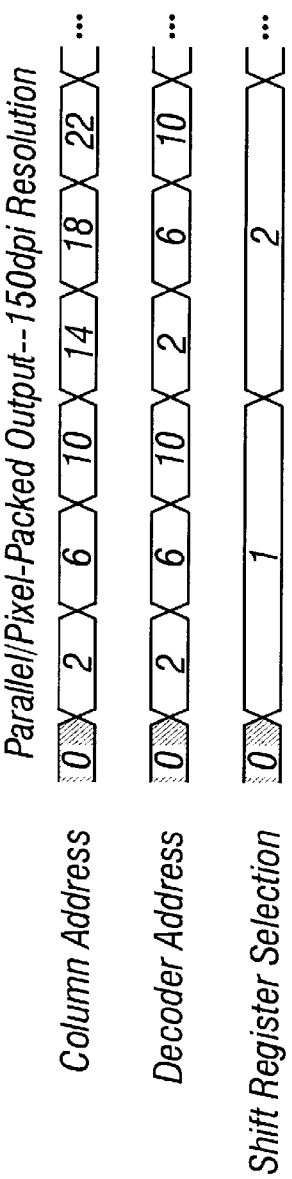

FIG. 6b shows column selection in the case where a present preferred readout mode is either parallel- or pixel-packed and 300 dpi resolution is desired. Under these circumstances, odd pixel signals are skipped. FIG. 6c shows column selection logic, again for parallel- or pixel pack readout mode, but with 150 dpi resolution instead.

Figure 6D:
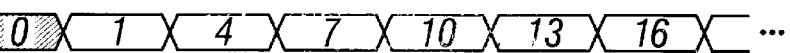
Figure 6D:
Figure 6D:
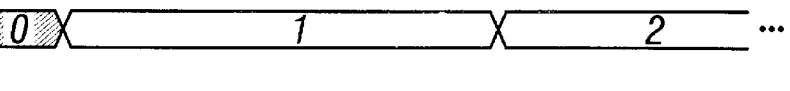
Figure 6D:
Figure 6D:
Figure 6D:
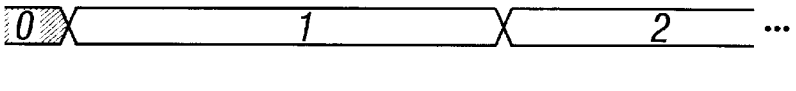
Figure 6D:
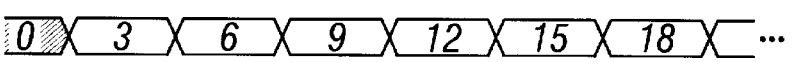
Figure 6D:
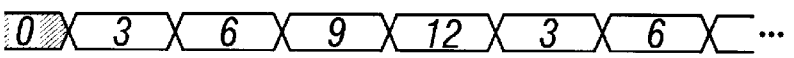
Figure 6D:
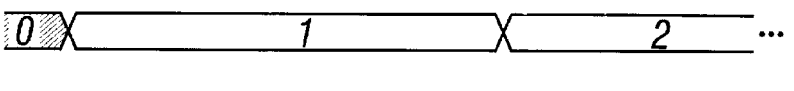
Figure 6E:
Figure 6E:
Figure 6E:
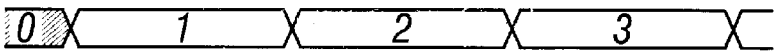
Figure 6E:
Figure 6E:
Figure 6E:
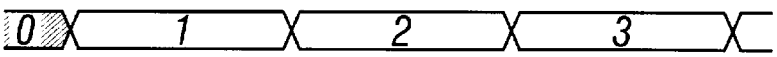
Figure 6E:
Figure 6E:
Figure 6E:
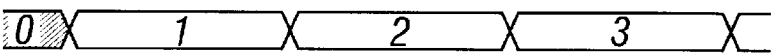
Figure 6F:
Figure 6F:
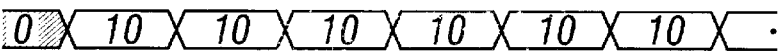
Figure 6F:
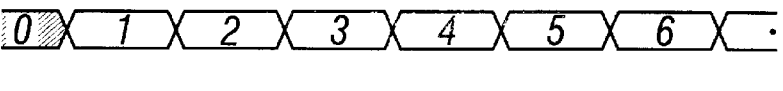
Figure 6F:
Figure 6F:
Figure 6F:
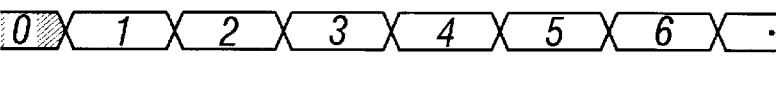
Figure 6F:
Figure 6F:
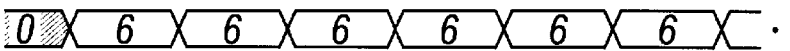
Figure 6F:
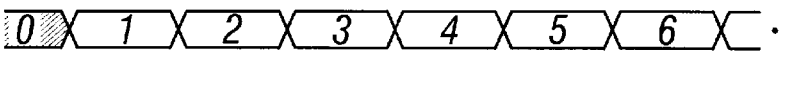

Column selection in the line-packed mode is necessarily more complicated since the row values of the three line arrays in which successive pixels are read out from are all different. The column selection for the three resolution modes is depicted by the timing diagrams of FIGS. 6d, 6e and 6f, respectively. Referring first back to FIG. 5e, it is seen that column address 1 selects columns in the following order: col1, col4, col7, col10, etc., while column address 2 starts with col2 selected, and column address 3 starts with col3 selected. Each shall be incremented by three (3) as shown. FIG. 6d basically shows, in accordance with a preferred embodiment, how the column selection logic of FIG. 5e might be implemented using the decoder and shift register logic described above; same for FIG. 6e (corresponding to FIG. 5f) and for FIG. 6f (corresponding to FIG. 5g).

Figure 7:
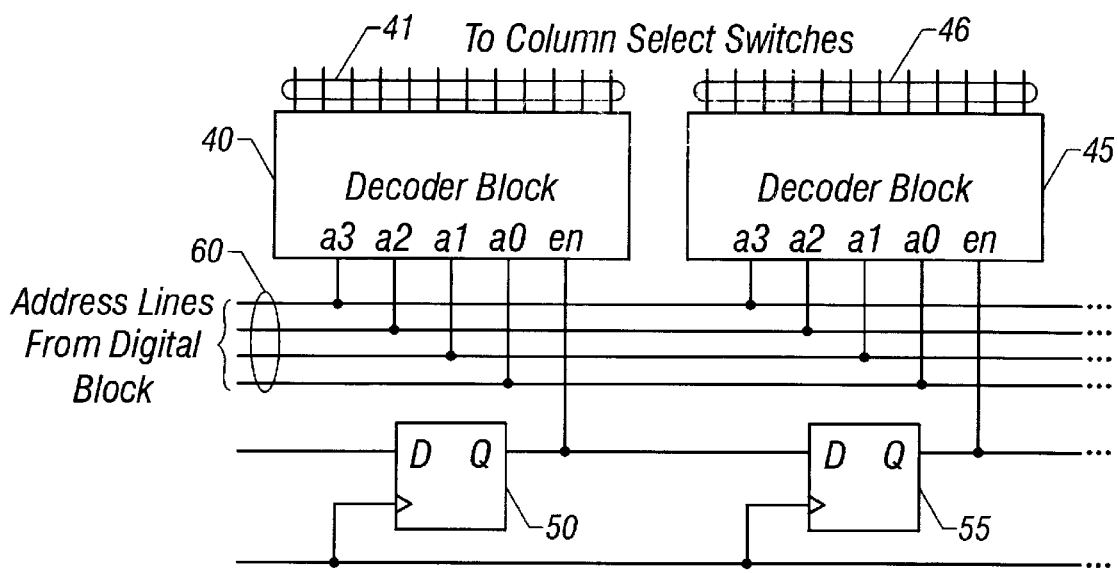
FIG. 7 shows column selection circuitry, including decoder block and shift register selection, in accordance with the present invention.

The 4-bit addressing lines 60 of FIG. 7 control all the decoders. Control over when a decoder block is selected is determined by the output (en) of the corresponding shift register 50, 55. In this regard, the output of each shift register 50, 55 functions as an enable for the associated decoder block 40, 45.

Figure 8:
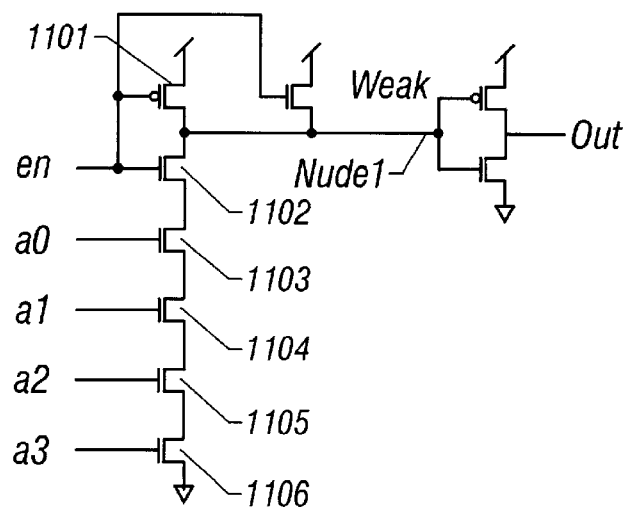
FIG. 8 shows a preferred implementation of an AND-gate cell for the decoder blocks shown in FIG. 7.

A preferred implementation of an AND-gate cell for each of decoder blocks 40, 45 in FIG. 7, is shown in FIG. 8. The cell architecture shown saves on area as it requires fewer transistors 1101–1106 than that described above in connection with FIG. 2. While the operation of the two cells is similar, the latter cell architecture incorporates the (en) input line selection to be coupled to the output of a corresponding flip flop 50, 55.

The proposed cell architecture comprised three fewer transistors than that in FIG. 2. The operation of the 4-bit AND with enable will now follow. For this purpose we assume all inputs are high (a0, a1, a2, a3) and en is '0'. Then because en is '0', the p-transistor 1101 will be turned on and the input of the inverter node1 shall be high. This makes the output of the AND gate '0'. When en is '1', the input of the inverter node1 will be pulled down to '0' because the en transistor 1102 turns on and the rest of the addressing transistors 1103, 1104, 1105, 1106 are already turned on. If one of the addressing transistors is not turned on, which is the case when the output of the AND gate is not the column to be selected, the input of the inverter nodel will be '1'. This is because the current sink path, which consists of transistors 1102, 1103, 1104, 1105, 1106, is not created and the weak pull-up transistor 1107 is turned on (by the en). Thus, it is shown that the 4-bit AND gate with enable output shall only have value '1' when both 4-bit addressing and enable (en) is selected.

The preferred embodiment as described offers a more complete solution in a CMOS active pixel sensor architecture. By combining decoder block functionality with shift selection logic to provide column selection adaptable for lowering the resolution of an imaging process as proposed, higher speed imaging is now possible. Furthermore, the added functionality is implemented in a manner which does not unduly impact chip size. More importantly, as has been shown above, the added functionality is compatible with, and in fact complements the specific architecture of an active pixel color linear sensor with variable readout mode functionality incorporated therein.

It should be readily apparent that while the preferred embodiment has been described in connection with linear active pixel sensors, non-linear (array) active pixel sensors may be contemplated.

In addition, it should be appreciated that while multi-color pixel line arrays are described, the claimed invention contemplates utility in any mono-colored (non-colored)multi-resolution implementation where it is desirable to retrieve like or related pixel elements stored on different line arrays, but not desirable to read out all the contents of the arrays.

Although only a few embodiments have been described in detail below, those having ordinary skill in the art would certainly understand that many modifications are possible in the preferred embodiment without departing from the teachings thereof.

All such modifications are intended to be encompassed by the following claims.

What is claimed is:

1. A single-chip active pixel sensor operable in at least a first and second resolution mode comprising:
    at least first and second line arrays defined by a plurality of pixel storage elements, each storage element causing a current pixel value stored therein to be readout in response to at least a corresponding column address signal; and
    column selection logic including a plurality of decoder blocks coupled to a plurality of shift registers, the column selection logic generating a first number of column address signals for reading out a first subset of the storage elements when in the first resolution mode, and generating a second number of column address signals for reading out a second subset of the storage elements when in the second resolution mode,
    wherein non-selected storage elements are not read out, and
    wherein the first and second subset include storage elements from all the line arrays.

2. The sensor of claim 1, wherein the second subset is a subset of said first subset.

3. The sensor of claim 1, wherein the sensor is a linear sensor.

4. The sensor of claim 3, wherein the sensor is a color linear sensor.

5. The sensor of claim 4, wherein the sensor is a three-color linear image sensor.

6. The sensor of claim 5, further comprising means for sampling data in line-packed mode, and wherein the second subset is a subset of the first subset with the first and second subsets being of the same color pixel elements.

7. The sensor of claim 6, wherein each line array includes at least 5100 storage elements.

8. The sensor of claim 6, wherein the plurality of shift registers is a chain of D flip flops.

9. The sensor of claim 8, wherein the output of each flip flop drives an enable input at an associated one of the plurality of decoder blocks.

10. The sensor of claim 5, wherein each line array includes at least 5100 storage elements.

11. The sensor of claim 1, wherein the sensor is an non-linear or array sensor.

12. The sensor of claim 10, wherein the plurality of shift registers is a chain of D flip flops.

13. The sensor of claim 12, wherein the output of each flip flop drives an enable input at an associated one of the plurality of decoder blocks.

14. An active pixel color linear image sensor operable in at least a first and second resolution mode and selectively operable in at least one of pixel-packed and line-packed pixel readout modes comprising:
    first, second and third line arrays each defined by a plurality of pixel storage elements, each storage element causing a current pixel value stored therein to be readout in response to at least a corresponding column address signal; and
    column selection logic including a plurality of decoder blocks coupled to a plurality of shift registers, the column selection logic generating a first number of column address signals for reading out a first subset of the storage elements when in the first resolution mode, and generating a second number of column address signals for reading out a second subset of the storage elements when in the second resolution mode,
    wherein non-selected storage elements are not read out, and
    wherein the first and second subset include storage elements from all three line arrays.

15. The sensor of claim 14, wherein the sensor is on a single-chip.

16. The sensor of claim 15, wherein the plurality of shift registers is a chain of D flip flops.

17. The sensor of claim 16, wherein the output of each flip flop drives an enable input at an associated one of the plurality of decoder blocks.

18. The sensor of claim 14, wherein the plurality of shift registers is a chain of D flip flops.

19. The sensor of claim 18, wherein the output of each flip flop drives an enable input at an associated one of the plurality of decoder blocks.

* * * * *